(12) United States Patent
Ideshio et al.

(10) Patent No.: US 8,851,254 B2
(45) Date of Patent: Oct. 7, 2014

(54) POWER TRANSMISSION DEVICE

(75) Inventors: Yukihiko Ideshio, Nisshin (JP);
Terufumi Miyazaki, Toyota (JP);
Toshihiko Kamiya, Toyota (JP); Shingo Eto, Gamagori (JP); Hironori Asaoka, Toyota (JP); Tetsuya Yamaguchi, Anjo (JP); Tomohide Suzuki, Kariya (JP)

(73) Assignees: Toyota Jidosha Kabushiki Kaisha, Tokyo (JP); Aisin AW Co., Ltd., Anjo (JP)

( * ) Notice: Subject to any disclaimer, the term of this patent is extended or adjusted under 35 U.S.C. 154(b) by 0 days.

(21) Appl. No.: 13/521,636

(22) PCT Filed: Jan. 13, 2011

(86) PCT No.: PCT/IB2011/000055
§ 371 (c)(1),
(2), (4) Date: Jul. 11, 2012

(87) PCT Pub. No.: WO2011/086461
PCT Pub. Date: Jul. 21, 2011

(65) Prior Publication Data
US 2013/0035202 A1  Feb. 7, 2013

(30) Foreign Application Priority Data
Jan. 14, 2010 (JP) ................................. 2010-006228

(51) Int. Cl.
| F16D 25/0638 | (2006.01) |
| F16H 45/02 | (2006.01) |
| F16D 25/10 | (2006.01) |
| B60K 6/46 | (2007.10) |
| B60K 6/40 | (2007.10) |
| B60L 11/14 | (2006.01) |
| F16H 45/00 | (2006.01) |

(52) U.S. Cl.
CPC ...... *F16D 25/0638* (2013.01); *F16H 2045/021* (2013.01); *B60K 6/46* (2013.01); *F16H 45/02* (2013.01); *B60K 6/40* (2013.01); *Y02T 10/7077* (2013.01); *F16H 2045/002* (2013.01); *B60L 11/14* (2013.01); *Y02T 10/6217* (2013.01); *F16H 2045/0284* (2013.01)
USPC .................... 192/3.25; 192/3.29; 192/48.619; 192/85.39

(58) Field of Classification Search
USPC .............. 192/85.25, 3.3, 3.29, 48.611, 48.61, 192/85.39, 3.25–3.27, 85.41, 85.619; 903/912, 914
See application file for complete search history.

(56) References Cited

U.S. PATENT DOCUMENTS

| 4,077,502 A | 3/1978 | Nitsche et al. |
| 6,684,995 B1 | 2/2004 | Page |

(Continued)

FOREIGN PATENT DOCUMENTS

JP  A-2006-137406  6/2006

(Continued)

OTHER PUBLICATIONS

Raw translation of JP-A2009-001165, inventors: Shimoda Kagehito, publication date: Aug. 1, 2009.*

(Continued)

*Primary Examiner* — Troy Chambers
*Assistant Examiner* — Lillian Nguyen
(74) *Attorney, Agent, or Firm* — Oliff PLC

(57) ABSTRACT

A power transmission device has a rigid body that includes a contact portion coming into contact with the first or second friction member and that moves the contact portion from a position of contact with the first or second friction member to a position of no contact with the first and second friction members, an elastic body that applies to the rigid body a force moving the contact portion to a position of contact with the first or second friction member, a first pushing mechanism that applies to the rigid body a pressure of liquid moving the contact portion to a position of contact with the first or second friction member, and a second pushing mechanism that applies to the rigid body a pressure of liquid moving the contact portion to a position of no contact with the first and second friction members.

10 Claims, 4 Drawing Sheets

(56) References Cited

U.S. PATENT DOCUMENTS

| | | | |
|---|---|---|---|
| 7,416,069 B2 * | 8/2008 | Tiesler | 192/48.611 |
| 8,322,504 B2 * | 12/2012 | Mueller et al. | 192/85.25 |
| 8,333,680 B2 * | 12/2012 | Kasuya et al. | 477/5 |
| 8,376,905 B2 * | 2/2013 | Kasuya et al. | 477/5 |
| 2007/0023250 A1 | 2/2007 | Mepham et al. | |
| 2010/0062899 A1 * | 3/2010 | Engelmann et al. | 477/86 |
| 2010/0105519 A1 * | 4/2010 | Kasuya et al. | 477/5 |

FOREIGN PATENT DOCUMENTS

| | | |
|---|---|---|
| JP | A-2009-001127 | 1/2009 |
| JP | A-2009-001165 | 1/2009 |
| WO | WO 03/027525 A2 | 4/2003 |

OTHER PUBLICATIONS

Japanese Office Action issued in Application No. 2010-006228; Dated Oct. 21, 2011 (With Partial Translation).

International Preliminary Report on Patentability issued in Application No. PCT/IB2011/000055; Dated Dec. 15, 2011.

Written Opinion of the International Searching Authority issued in Application No. PCT/IB2011/000055; Dated May 30, 2011.

International Search Report issued in Application No. PCT/IB2011/000055; Dated May 30, 2011.

* cited by examiner

F I G . 2
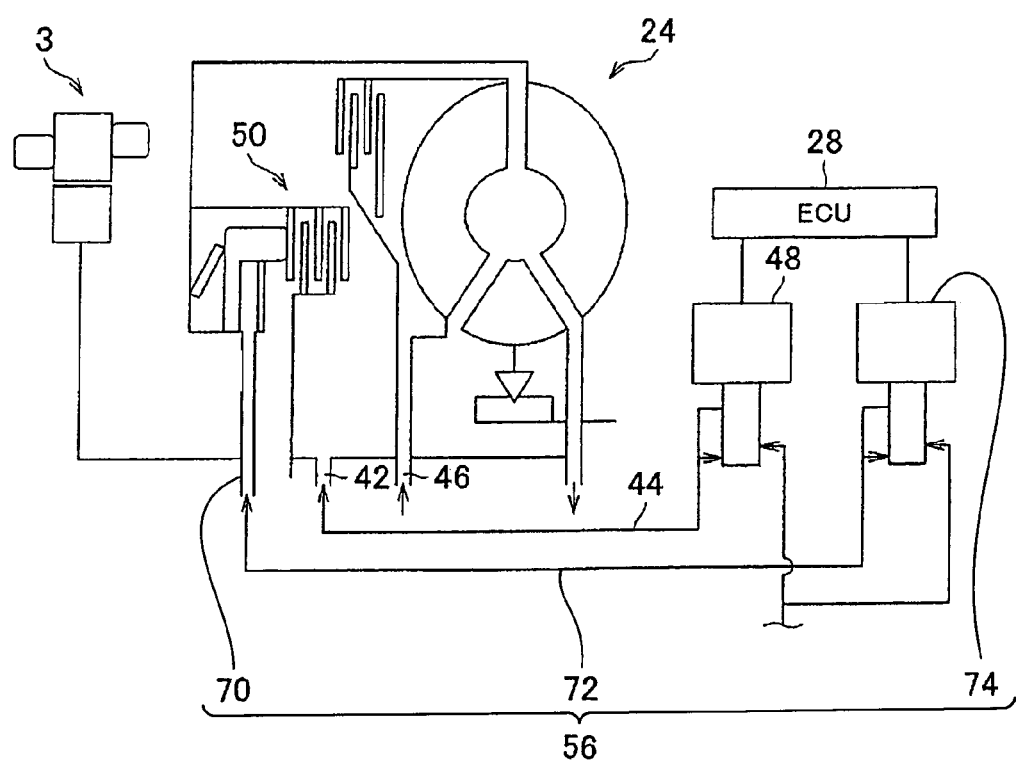

POWER TRANSMISSION DEVICE

BACKGROUND OF THE INVENTION

1. Field of the Invention

The invention relates to a power transmission device having a switching mechanism that allows and interrupts transmission of power.

2. Description of the Related Art

Hybrid automobiles having an engine and a motor (electric motor) as drive sources have recently been developed. There are also hybrid automobiles in which a motor serving as a drive source is also used as a starter.

For example, Japanese Patent Application Publication No. 2006-137406 (JP-A-2006-137406) discloses a drive apparatus for a vehicle including an engine, a transmission driven via a torque converter, an intermediate output shaft transmitting rotation drive power to the torque converter, an electric motor having a rotor fixed to the outer circumferential side of the intermediate output shaft, and a clutch mechanism disposed between the crankshaft of the engine and the inner peripheral surface of the rotor. The clutch mechanism has a hub member having an outer wheel portion that rotates integrally with the crankshaft and a pair of clutch plates disposed on the outer periphery of the hub member and on the inner peripheral surface of the rotor and pressed by a plate spring. The clutch mechanism connects the crankshaft of the engine to the intermediate output shaft to enable the vehicle to run, and enables restart control that drives the crankshaft of the engine using the electric motor in a state in which no load is applied on the transmission side.

As described in JP-A-2006-137406, the rotation generated by the electric motor can be transmitted to the engine by engaging (connecting) the clutch by the plate spring and connecting the crankshaft of the engine to the intermediate output shaft. As a result, the electric motor can be used as a starter.

However, in the device described in JP-A-2006-137406, a spring with a large pushing load should be used as the plate spring in order to maintain the engaged state even when a large load is applied to the clutch. Therefore, a large plate spring should be used and the device is increased in size. Where a plate spring with a large pushing load is used, the spread of load increases and therefore a load required for switching between engagement and disengagement is difficult to control. Further, a load necessary to disengage the clutch also increases and the amount of energy used for disengagement rises. In other words, the amount of energy necessary for switching the power transmission paths increases.

SUMMARY OF INVENTION

The invention provides a power transmission device that can switch power transmission paths with good efficiency and high accuracy.

An aspect of the invention provides a power transmission device. The power transmission device includes: a first rotating body rotated by a first drive mechanism; a second rotating body rotated by a second drive mechanism; and a clutch mechanism switching between an engaged state and a disengaged state of the first rotating body and the second rotating body. The clutch mechanism has an engagement portion that includes a first friction member connected to the first rotating body and a second friction member connected to the second rotating body and disposed to face the first friction member, and that engages the first rotating body with the second rotating body by contact of the first friction member and the second friction member, a rigid body that includes a contact portion coming into contact with the first friction member or the second friction member, and that moves the contact portion from a position of contact with the first friction member or the second friction member to a position of no contact with the first friction member and the second friction member, an elastic body that applies to the rigid body a force in the direction of moving the contact portion to a position of contact with the first friction member or the second friction member, a first pushing mechanism that applies to the rigid body a pressure of liquid in a direction for moving the contact portion to a position of contact with the first friction member or the second friction member, and a second pushing mechanism that applies to the rigid body a pressure of liquid moving the contact portion to a position of no contact with the first friction member and the second friction member.

In the above power transmission device, the rigid body may be disposed in a position in which the rigid body is in contact with the first friction member and brings the first friction member and the second friction member into contact with each other.

Further, in the above power transmission device, the first friction member may be constituted by a plurality of plate-shaped first friction bodies; the second friction member may be constituted by a plurality of plate-shaped second friction bodies; and the first friction bodies and the second friction bodies may be disposed alternately.

Further, in the above power transmission device, the first pushing mechanism and the second pushing mechanism may adjust a force applied to the rigid body by adjusting at least one of an amount and a pressure of liquid supplied to the rigid body side.

Further, the above power transmission device may further include a torque converter connected to the second rotating body. The first pushing mechanism may use circulating fluid of the torque converter as liquid.

Further, the above power transmission device may further include a torque converter connected to the second rotating body. The second pushing mechanism may use circulating fluid of the torque converter as liquid.

Further, in the above power transmission device, the engagement portion, the rigid body, and the elastic body may be disposed inside the torque converter.

Further, in the above power transmission device, when the engagement portion is in the disengaged state, the first pushing mechanism may make the pressure of liquid moving the contact portion to a position of contact with the first friction member or the second friction member equal to or lower than a set pressure value.

Further, in the above power transmission device, when the engagement portion is in the engaged state, the second pushing mechanism may make the pressure of liquid moving the contact portion to a position of no contact with the first friction member and the second friction member equal to or lower than a set pressure value.

Further, in the above power transmission device, the engagement portion may engage the first rotating body with the second rotating body when a force which acts upon the rigid body is an only force by which the elastic body pushes the rigid body.

Further, in the above power transmission device, the first drive mechanism may be a combustion engine, and the second drive mechanism may be an electric motor.

Further, in the above power transmission device, the combustion engine may be an internal combustion engine, the power transmission device may be provided at a vehicle, and the force applied by the elastic body to the rigid body may be a force engaging the first rotating body with the second rotating body so that necessary torque during a starter mode of the vehicle is transmitted to the first rotating body and the second rotating body.

The power transmission device in accordance with the aspect of the invention can switch power transmission paths with good efficiency and high accuracy.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 2 is a schematic diagram illustrating a circulation path of working oil in the power transmission device;

DETAILED DESCRIPTION OF EMBODIMENTS

Examples of the drive apparatus including the power transmission device will be explained below with reference to the appended drawings. The invention is not limited to the examples. The drive apparatus explained hereinbelow is mainly used as a drive apparatus for a four-wheel automobile, but this drive apparatus can be also used for automobiles other than four-wheel automobiles, for example, two-wheel automobiles. Further, the drive apparatus can be also used as a drive apparatus or various machines such as ships and airplanes.

Example 1

Figure 1:
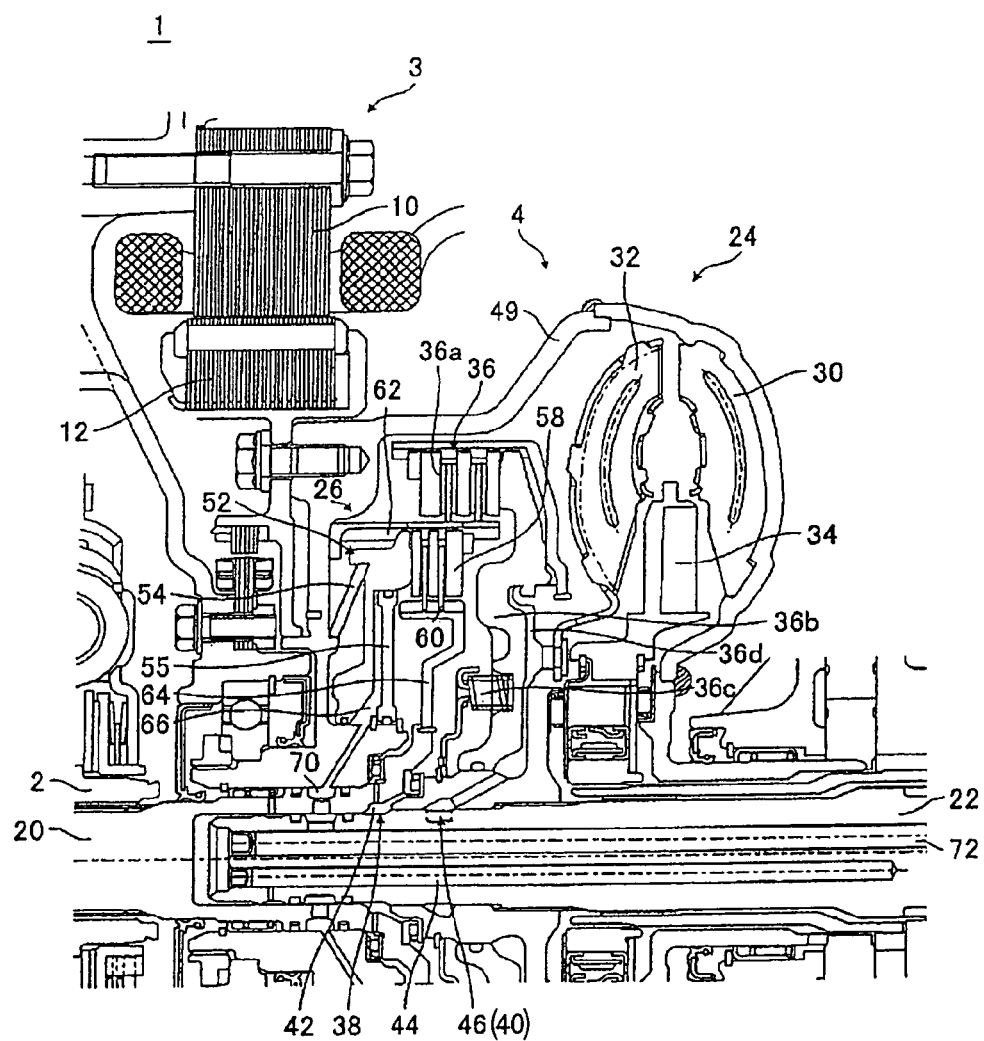
FIG. 1 is a schematic diagram illustrating an example of general structure of the drive apparatus including a power transmission device.

FIG. 1 is a schematic diagram illustrating a configuration example of a drive apparatus including a power transmission device. FIG. 2 is a schematic diagram illustrating a circulation path of working oil of the power transmission device. A drive apparatus 1 is constituted by an engine 2, a motor 3, and a power transmission device 4. In this configuration, the engine 2 and the motor 3 are power sources, and the power transmission device 4 serves to transmit drive power outputted from the engine 2 and the motor 3 to other components. A transmission mechanism is an example of the other component. The drive apparatus 1 transmits the drive power outputted by the engine 2 and the motor 3 to other components via the power transmission device 4 and rotates and operates the other components. As a result, an apparatus provided with the drive apparatus 1 can be driven and moved or can produce an output.

The engine 2 burns the fuel such as gasoline, light oil, or bio-ethanol and outputs the heat as mechanical power. Various combustion devices such as an internal combustion engine and an external combustion engine can be used as the engine 2. The engine 2 transmits the power to the power transmission device 4.

The motor 3 is the so-called motor generator and can function as a motor that converts the supplied electric power into mechanical power, a generator that converts the inputted mechanical power into electric power, and a starter that starts the engine 2. The motor 3 is constituted by a stator 10 and a rotor 12 that can rotate with respect to the stator 10. Where electric power is supplied to the motor 3, the rotor 12 is rotated with respect to the stator 10. Further, where the rotor 12 is rotated by the external power with respect to the stator 10, the mechanical power generated by the rotation is taken out as electric power. The rotor 12 of the motor 3 is connected to the power transmission device 4.

The power transmission device 4 transmits the mechanical power outputted from the engine 2 and the motor 3 to other components and has an input shaft 20, an output shaft 22, a torque converter 24, a clutch mechanism 26, and an Electronic Control Unit (ECU) 28 that controls the operation of various components of the power transmission device 4. If necessary, the power transmission device 4 also transmits the mechanical power outputted from the motor 3 to the engine 2.

The input shaft 20 is connected to the engine 2 and rotates together with a rotational portion of the engine 2.

The output shaft 22 is connected to other components and the torque converter 24, rotates together with part of the torque converter 24, and transmits the mechanical power transmitted from the torque converter 24 to other components.

The torque converter 24 has a pump impeller 30, a turbine runner 32, a stator 34, a lockup clutch mechanism 36, a circulating oil supply means 38, a lockup oil supply means 40, and a front cover 49. The components of the torque converter 24 are disposed in a region covered by the front cover 49. The front cover 49 is connected to the rotor 12 of the motor 3 and rotates together with the rotor 12.

The torque converter 24 is a fluid transmission mechanism that can transmit the mechanical power from the pump impeller 30 to the turbine runner 32, while increasing the torque. More specifically, the torque converter 24 transmits the mechanical power received by the pump impeller 30 to the turbine runner 32 via a working fluid (circulating oil, for example, automatic transmission fluid (ATF)). The flow direction of the working fluid that has flown from the pump impeller 30 to the turbine runner 32 is changed by the stator 34 and the working fluid flows again into the pump impeller 30. As a result, the torque converter 24 transmits power, while increasing the torque transmitted from the pump impeller 30 to the turbine runner 32 (while reducing the revolution speed proportionally to the increase in torque). The working fluid (circulating oil) flowing inside the torque converter 24 is supplied by the circulating oil supply means 38.

The pump impeller 30 is connected to the rotor 12 of the motor 3, with the front cover 49 being interposed therebetween, and rotates together with the rotor 12. In other words, the pump impeller 30, front cover 49, and rotor 12 rotate together. Further, the turbine runner 32 is connected to the output shaft 22 and rotates together with the output shaft 22.

The lockup clutch mechanism 36 can transmit the mechanical drive power transmitted to the front cover 49 directly to the output shaft 22, without using the working fluid located inside the torque converter 24. The lockup clutch mechanism 36 has a friction engagement portion 36a, a support portion 36b supporting the friction engagement portion 36a, and a spring 36c that biases the support portion 36b to the turbine runner 32 side. The support portion 36b can move with respect to the turbine runner 32 in the direction perpendicular to the rotation direction (right and left directions in FIG. 1). An oil chamber 36d is formed between a wall surface of the support portion 36b and a wall surface of the turbine runner 32.

In the lockup clutch mechanism 36, where the working oil (lockup oil) is supplied to the oil chamber 36d by the below-described lockup oil supply means 40 and the pressure inside the oil chamber 36d rises to a pressure equal to or higher than a fixed pressure, the support portion 36b is moved apart from the turbine runner 32 by the pressure inside the oil chamber 36d. As a result, the friction engagement portion 36a comes into contact with the front cover 49 or a member rotating together with the front cover 49. Where the friction engagement portion 36a and the front cover 49 are thus directly or indirectly connected, a state is assumed in which the pump impeller 30 and the turbine runner 32 rotate together. As a result, the drive power transmitted to the front cover 49 is transmitted as is to the output shaft 22.

If not in the lockup state, the lockup clutch mechanism 36 is not in contact with the front cover 49. Therefore, as described hereinabove, the drive power transmitted to the front cover 49 is transmitted to the output shaft 22 via the pump impeller 30, working fluid, and turbine runner 32.

In the torque converter 24, only the oil chamber 36d is filled with the working oil supplied to the oil chamber 36d, and no working oil is supplied to other portions. In other words, the working oil is supplied to a region different from that of the working fluid (circulating oil).

The circulating oil supply means 38 is a supply device that supplies the working fluid (circulating oil) into the interior section covered by the front cover 49 of the torque converter 24. The circulating oil supply means 38 has a supply port 42, an oil path 44 connected to the supply port 42, and a circulating oil supply pump 48 that supplies the working fluid to the oil path 44. The circulating oil supply means 38 supplies the working fluid from the circulating oil supply pump 48 into the front cover 49 of the torque converter 24 via the oil path 44 and the supply port 42, thereby creating a state in which the inside of the front cover 49 is filled with the working oil. The inside of the front cover 49 is configured such that the working fluid does not exit from ports other than the supply port 42 and the discharge port of the working fluid. By continuously supplying the working fluid from the circulating oil supply means 38 into the front cover 49 of the torque converter 24, it is possible to circulate the working fluid inside the front cover 49.

The lockup oil supply means 40 is a supply device that supplies a working oil (lockup oil) to the oil chamber 36d. The lockup oil supply means 40 has a supply port 46 connected to the oil chamber 36d. The lockup oil supply means 40 also has an oil path connected to the supply port 46 and a supply pump that supplies the working oil (this configuration is not shown in the figure).

The clutch mechanism 26 is a switching mechanism that switches engagement and disengagement of the front cover 49 and the input shaft 20. In other words, the clutch mechanism 26 switches between a state in which the motor 3 connected to the front cover 49 and the engine 2 connected to the input shaft 20 are engaged and a state in which the two are disengaged. Further, the clutch mechanism 26 is also a mechanism switching between a state in which the engine 2 connected to the input shaft 20 and the torque converter 24 (front cover 49) are engaged and a state in which the two are disengaged. The clutch mechanism 26 has an engagement portion 50, a piston 52, an elastic body 54, a partition plate 55, and a working oil supply means 56. The engagement portion 50, piston 52, elastic body 54, and partition plate 55 are disposed inside the front cover 49.

The engagement portion 50 has a first friction member 58, a second friction member 60, a first holding portion 62, and a second holding portion 64. The first friction member 58 is constituted by a plurality of first friction plates. The second friction member 60 is also constituted by a plurality of second friction plates and is disposed opposite the first friction member 58. More specifically, the plurality of first friction plates and the plurality of second friction plates are stacked and disposed alternately. Therefore, two surfaces (two surfaces with the largest area of a plate-shaped member) of the first friction plate are disposed to face a respective second friction plate.

The first holding portion 62 holds (fixes) an end portion of the first friction member 58 (more specifically, the first friction plate) and is fixed to the front cover 49. As a result, the first holding portion 62 and the first friction member 58 rotate together with the front cover 49. The second holding portion 64 holds (fixes) an end portion of the second friction member 60 (more specifically, the second friction plate) and is fixed to the input shaft 20. As a result, the second holding portion 64 and the second friction member 60 rotate together with the input shaft 20. In the engagement portion 50, when no external force acts, the first friction member 58 and the second friction member 60 are not in contact or substantially not in contact with each other. In this state, no power is transmitted between the first friction member 58 and the second friction member 60 and these two members rotate independently from each other. By contrast, when an external force acts, more specifically, when the below-described piston 52 pushes the first friction member 58 and the first friction member 58 and the second friction member 60 come into contact with each other, friction occurs between the first friction member 58 and the second friction member 60, and power is transmitted between the first friction member 58 and the second friction member 60. Where power is thus transmitted, the first friction member 58 and the second friction member 60 rotate together. Depending on the value of the external force, a difference in rotation can occur between the first friction member 58 and the second friction member 60, that is, the so-called semi-clutched state can be assumed. In the engagement portion 50, a member with high rigidity is disposed on the surface of the portion where the first friction member 58 and the second friction member 60 are stacked on the side opposite that of the surface that is contact with the piston 52. As a result, the first friction member 58 and the second friction member 60 are prevented from bowing or bending under the effect of the pushing force of the piston 52.

The piston 52 is constituted by rigid body. One end of the piston comes into contact with the end first friction plate of the first friction member 58. More specifically, one end of the piston 52 comes into contact with the surface of the first friction plate that is the farthest from the tube turbine runner 32, the surface being opposite the surface of the first friction plate facing the second friction plate, and an end portion (other end portion) on the side opposite that in contact with the first friction member 58 is supported by the front cover 49. The piston 52 is supported by the front cover 49 in a state such that at least the end portion that is in contact with the first friction member 58 can move in the direction perpendicular to the rotation direction. The front cover 49 side of the piston 52 (between the piston 52 and the front cover 49) is filled with the working fluid flowing inside the front cover 49.

The elastic body 54 is disposed between the piston 52 and the front cover 49 and pushes the piston 52 in the direction of separating from the front cover 49 (That is, the elastic body 54 is disposed between the piston 52 and the front cover 49 and pushes the piston 52 so that the piston 52 moves apart from the front cover 49). In other words, the elastic body 54 generates a biasing force in the direction of enlarging the distance between the piston 52 and the front cover 49 (the elastic body 54 generates a rightward biasing force in FIG. 1) and causing the piston 52 to push the first friction member 58. Various elastic members such as a plate spring or a round spring can be used as the elastic body 54.

The partition plate 55 is a plate-shaped member disposed to face a surface of the piston 52 that is opposite the surface where the elastic body 54 is disposed. The partition plate 55 is supported by the piston 52 and the front cover 49. An oil chamber 66 is formed in a region bounded by the surface of the partition plate 55 that faces the piston 52 and the portion of the front cover 49 located between the partition plate 55 and the piston 52. The oil chamber 66 is also bounded by the piston 52 and the partition plate 55. The oil chamber 66 is filled with the working oil supplied from the working oil supply means 56. In other words, the working fluid supplied from the circulating oil supply means 38 does not enter the oil chamber 66.

The working oil supply means 56 has a supply port 70, an oil path 72, and a working oil supply pump 74. The supply port 70 is an opening communicating with the oil chamber 66 and connected to the oil path 72. The oil path 72 is connected to the working oil supply pump 74. The working oil supply means 56 supplies the working oil discharged from the working oil supply pump 74 to the oil chamber 66 via the oil path 72 and the supply port 70. By supplying the working oil into the oil chamber 66 with the working oil supply means 56 in such a manner, it is possible to obtain a state in which the oil chamber 66 is filled with the working oil. Each portion of the clutch mechanism 26 has the above-described configuration.

The clutch mechanism 26 assumes a state in which the space between the piston 52 and the front cover 49 is filled with the working fluid (working fluid circulating in the torque converter 24) supplied from the circulating oil supply means 38 and the space between the piston 52 and the partition plate 55 is filled with the working oil supplied from the working oil supply means 56. As a result, the piston 52 is pushed in the direction of pushing the first friction member 58 (the piston 52 is pushed rightward in FIG. 1) by the working fluid supplied from the circulating oil supply means 38 and pushed in the direction of separating from the first friction member 58 by the working oil supplied from the working oil supply means 56 (the piston 52 is pushed leftward in FIG. 1). Further, the piston 52 is also pushed by the elastic body 54 in the direction of pushing the first friction member 58 (That is, the piston 52 is pushed by the elastic body 54 so that the piston 52 pushes the first friction member 58). Where the first friction member 58 is pushed by the piston 52, the engagement portion 50 assumes a state in which the first friction member 58 and the second friction member 60 are in contact and engaged with each other.

A torque T generated by the clutch mechanism 26 (torque generated by the engagement of the engagement member 50) can be represented by the following equation.

$$T = (2/3) \times \mu \times N \times (D_2^3 - D_1^3)/(D_2^2 - D_1^2) \times (F_{sp} + P_a \times A - P_{K0} \times A) \quad \text{(Eq. 1)}$$

Where $\mu$ is a friction coefficient of the friction plate, N is the number of friction plates (total number of the first friction plates and the second friction plates), $D_1$ is an inner diameter of the friction plate, $D_2$ is an outer diameter of the friction plate, $F_{sp}$ is a force by which the elastic body 54 pushes the piston 52, $P_a$ is a pressure inside a chamber filled with the working fluid supplied from the circulating oil supply means 38, and $P_{K0}$ is a pressure inside the oil chamber 66 supplied from the working oil supply means 56.

Since the force $F_{sp}$ by which the elastic body 54 pushes the piston 52 is determined by design, the torque of the clutch mechanism 26 can be controlled by adjusting the pressure $P_a$ inside a chamber filled with the working fluid supplied from the circulating oil supply means 38 and the pressure $P_{K0}$ inside the oil chamber 66 supplied from the working oil supply means 56 in the clutch mechanism 26. For example, the torque T of the clutch mechanism 26 can be increased by increasing the pressure $P_a$ or reducing the pressure $P_{K0}$. In other words, the torque T can be increased by increasing the amount of working fluid supplied from the circulating oil supply means 38 or increasing the supply pressure thereof, or by decreasing the amount of working oil supplied from the working oil supply means 56 or reducing the supply pressure thereof. Further, the torque T of the clutch mechanism 26 can decreased by decreasing the pressure $P_a$ or increasing the pressure $P_{K0}$. Where the torque is made zero, a state can be assumed in which the engagement portion is disengaged, as mentioned hereinabove, and no power is transmitted.

Since the force $F_{sp}$ is produced in the clutch mechanism 26 by which the elastic body 54 pushes the piston 52, when no working oil is supplied, the first friction member 58 is pushed with a constant force by the piston, the engaged state is assumed, and power is transmitted between the front cover 49 and the input shaft 20.

Thus, with the power transmission device 4 of the present embodiment, even when the fluid pressure does not act, the elastic body 54 pushes the piston 52 with the force $F_{sp}$, thereby making it possible to obtain the engaged state of the clutch mechanism 26. As a result, when the engine 2 is started, even when various oil supply means are not actuated, the mechanical drive power outputted by the motor 3 can be transmitted to the engine 2 via the front cover 49, clutch mechanism 26, and input shaft 20. Therefore, the engine 2 can be rotated and the engine 2 can be started.

Further, in a drive state, the torque of the clutch mechanism 26 can be adjusted by adjusting the working oil (or working fluid) supplied from the working oil supply means 56 and the circulating oil supply means 38. In other words, the torque can be increased and it also can be decreased. As a result, an allowed torque amount of the clutch mechanism 26 can be increased and a large torque can be transmitted by the clutch mechanism 26.

Since the torque of the clutch mechanism 26 can be increased by the circulating oil supply means 38, a pushing force of the elastic body 54 can be decreased. More specifically, a pushing force may be obtained of a degree such that can transmit the torque necessary for a starter mode (i.e., a mode that the engine is driven by the motor when the engine of the vehicle starts). By so decreasing the pushing force of the elastic body 54, it is possible to reduce the elastic body 54 in size. Further, the effect produced by an error in the pushing force of each elastic body 54 on control can be reduced. For example, since the force $F_{sp}$ can be of an order of thousands of N and $P_a \times A$ can be of an order of several tens of thousands of N, even if the $F_{sp}$ includes an error of about 10% (difference in performance between the elastic bodies), the effect produced on the engagement-disengagement operation of the clutch mechanism 26 can be reduced. As a result, the power transmission paths can be switched by highly accurate control, that is, by switching clutch engagement and disengagement.

Further, by providing the elastic body 54, it is possible to obtain the engaged state of the clutch mechanism 26 in a normally closed state, that is, when no control signal is generated. As a result, in a starter mode in which no hydraulic pressure acts, as mentioned hereinabove, the power generated by the motor 3 can be transmitted to the engine 2. Therefore, the motor 3 can be used as a starter, and no separate motor should be provided as a starter. Further, because of a normally closed state, it is not necessary to drive the hydraulic system when the engine is started and therefore no power source required to drive the hydraulic system can be provided. In addition, because of a normally closed state, power generated by the engine 2 can be transmitted to the output shaft 22 via the input shaft 20 and the torque converter 24 and the vehicle can run even when the means for supplying the working oil fails.

The pushing force produced by the elastic body 54 can be reduced and the pressure of the working fluid supplied from the circulating oil supply means 38 can be also reduced by adjustment. Therefore, the pressure of the working oil supplied from the working oil supply means 56, which is necessary to disengage the clutch mechanism 26 in the drive state, can be reduced. In other words, when a pressure in one direction is generated by the pushing force of the elastic body and a pressure in the other direction is generated by a force of the working oil, the term $(F_{sp}+P_a \times A - P_{K0} \times A)$ in Eq. (1) becomes $(F_{sp}-P_{K0} \times A)$. As for the force for engagement in this case, in the $(F_{sp}-P_{K0} \times A)$ configuration, $F_{sp}$ should be increased to enable the transmission of maximum torque of the clutch mechanism. Therefore, $P_{K0}$ serving to disengage the clutch also should be a strong force. By contrast, in the present example, as shown by $(F_{sp}+P_a \times A - P_{K0} \times A)$ of Eq. (1), a force that engages the clutch can be adjusted by $P_a$ and, therefore, the force $F_{sp}$ can be reduced. Further, when the clutch is disengaged, $P_{K0}$ necessary for disengagement, that is, a force overcoming $F_{sp}+P_a \times A$, can be decreased by reducing $P_a$. Thus, by enabling the decrease in pressure, it is possible to reduce a pressure generated by the pump. As a result, energy consumed by the power transmission device 4 can be reduced and energy generated by the drive apparatus 1 or accumulated energy can be efficiently used.

By providing the clutch mechanism 26 inside the torque converter 24 and using the working fluid supplied by the circulating oil supply means 38, as in the present example, it is possible to reduce the number of necessary oil pressure supply means. As a result, the device configuration can be simplified.

By using a configuration in which the piston 52 is brought into contact with the first friction member 58 of the engagement portion 50, it is possible to bring the piston 52 into contact, without difference in rotation, and inhibit wear of the piston 52 or the first friction member 58. In other words, by bringing into contact members that are connected to the front cover 49 and rotate together therewith, it is possible to reduce wear generated in the drive state.

Example 2

Figure 3:
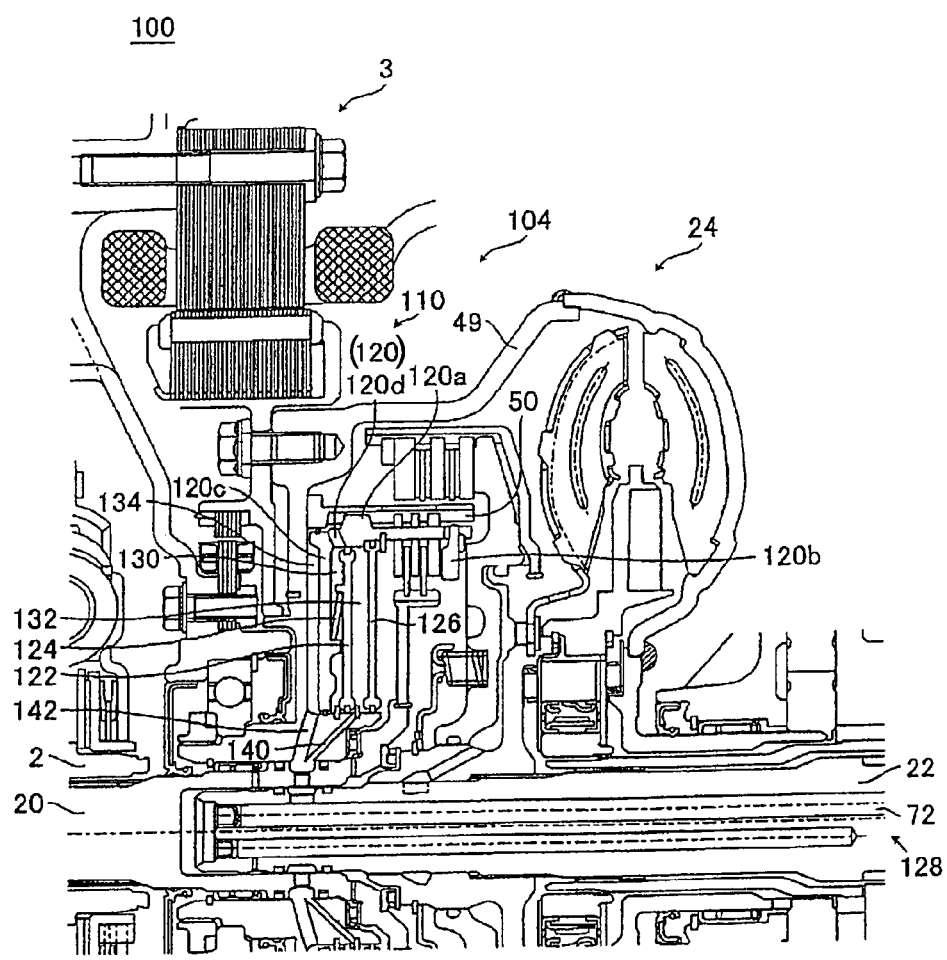
FIG. 3 is a schematic diagram illustrating another example of general structure of the drive apparatus including the power transmission device.

Example 2 will be explained below with reference to FIG. 3. The configuration of a drive apparatus 100 shown in FIG. 3 is similar to that of the drive apparatus shown in FIG. 1, except that the clutch mechanism 110 of the power transmission device 104 is different. Accordingly, the components similar to those of Example 1 will be assigned with same reference numerals and the explanation thereof will be omitted. Thus, the explanation will be focused on specific features of Example 2.

The clutch mechanism 110 has an engagement portion 50, a piston 120, a first partition plate 122, an elastic body 124, a second partition plate 126, and a working oil supply means 128. In this configuration, the engagement portion 50, piston 120, first partition plate 122, elastic body 124, and second partition plate 126 are disposed inside a front cover 49. The engagement portion 50 is configured similarly to the engagement portion 50 of the clutch mechanism 26 of Example 1 described hereinabove. The configuration of a working oil supply means 128 is similar to that of the working oil supply means 56, except that two supply ports 140, 142 are provided that are formed in the front cover 49 and connect an oil path 72 with the inside of the front cover 49. The end portions of the supply port 140 and the supply port 142 connected to the oil path 72 merge in the intermediate section thereof.

The piston 120 is a member configured of a rigid body and has a L-shaped cross section. The piston 120 has a protruding portion 120b (protruding portion extending in the direction in which the L shape takes a U shape) extending at a right angle at the end portion of a section 120a corresponding to one linear segment of the L shape, and this protruding portion 120b comes into contact with a first friction plate at the end of the first friction member 58 (more specifically, the surface of the first friction plate that is the closest to the turbine runner 32 on the side opposite that of the surface facing the second friction plate). Further, the end portion of the section 120c corresponding to the other linear segment of the L shape is supported by the front cover 49. At least the end portion of the piston 120 that is in contact with the first friction member 58 is supported by the front cover 49 in a state in which this end portion can move in the direction perpendicular to the rotation direction. The connection portion of the section 120a and the section 120c is in movable contact with a first holding portion 62. An oil seal or the like is disposed in the contact portion, thereby preventing a fluid from flowing through the contact portion. In the piston 120, an opening 120d is provided on the protruding portion 120b side, from the contact portion, of the section 120a in the vicinity of the connection portion of the section 120a and the section 120c.

The first partition plate 122 is disposed between the protruding portion 120b and the section 120c and oriented substantially parallel to the section 120c of the piston 120. The first partition plate 122 is fixed at one end thereof to the front cover 49 and comes into contact at the other end thereof with the section 120a of the piston 120. The end portion that is in contact with the section 120a of the piston 120 is supported so that this end portion can move, while maintaining the contact.

The elastic body 124 is disposed between the section 120c of the piston 120 and the first partition plate 122 and pushes the section 120c and the first partition plate 122 in the direction of separating the section 120c and the first partition plate 122.

The second partition plate 126 is disposed between the protruding portion 120b and the first partition plate 122 and oriented substantially parallel to the section 120c of the piston 120. The second partition plate 126 is fixed at one end thereof to the front cover 49 and comes into contact at the other end thereof with the section 120a of the piston 120.

The piston 120, first partition plate 122, second partition plate 126, and the above-described front cover 49 are disposed in the above-described manner. A region bounded by the piston 120 and the first partition plate 122 serves as a first oil chamber 130, a region bounded by the first partition plate 122 and the second partition plate 126 serves as a second oil chamber 132, and a region bounded by the section 120c of the piston 120 (surface on the side opposite that of the surface that is in contact with the elastic body 124) and the front cover 49 serves as a third oil chamber 134. In the first oil chamber 130, second oil chamber 132, and third oil chamber 134, oil seals are disposed in connection portions of members in the regions bounding the oil chambers and liquid is prevented from leaking from zones other than the fluid supply ports.

The first oil chamber 130 communicates with the aforementioned opening 120d and filled with the circulating oil flowing inside the front cover 49. The second oil chamber 132 communicates with the supply port 140, and the third oil chamber 134 communicates with the supply port 142. The working oil discharged from the working oil supply pump 74 and flowing in the oil path 72 is supplied to the second oil chamber 132 and the third oil chamber 134.

The clutch mechanism 110 has the above-described configuration and is in a state in which the first oil chamber 130 is filled with the working fluid (working fluid circulating in the torque converter 24) supplied from the circulating oil supply means 38, and the second oil chamber 132 and the third oil chamber 134 are filled with the working oil supplied from the working oil supply means 128.

As a result, the piston 120 is pushed by the working fluid supplied from the circulating oil supply means 38 in the direction of pushing the first friction member 58. More specifically, where the working fluid supplied from the circulating oil supply means 38 is supplied to the first oil chamber 130 and the pressure inside the first oil chamber 130 rises, a force acts to increase the volume of the first oil chamber 130. In this case, since the first partition plate 122 is fixed to the front cover 49, the first partition plate does not move, whereas the piston 120 is supported movably. Therefore, the pressure inside the first oil chamber 130 pushes the section 120c in the direction of separating from the first partition plate 122 and acts as a force moving the piston 120 and reducing the volume of the third oil chamber 134. As a result, the piston 120 is pushed in the direction of pushing the first friction member 58 (In FIG. 3, the piston 120 is pushed leftward).

The piston 120 is pushed in the direction of separating from the first friction member 58 by the working oil supplied from the working oil supply means 128. More specifically, where the working oil supplied from the working oil supply means 128 is supplied to the second oil chamber 132 and the pressure inside the second oil chamber 132 rises, a force acts to increase the volume of the second oil chamber 132. In this case, since the second partition plate 126 is fixed to the piston 120, the total volume of the first oil chamber 130 and the second oil chamber 132 is constant and does not change. As mentioned hereinabove, the first partition plate 122 does not move because it is fixed to the front cover 49, whereas the piston 120 is supported movably. For this reason the pressure inside the second oil chamber 132 acts to move the second partition plate 126 in the direction of separating from the first partition plate 122. In other words, a force acts that pushes the second partition plate 126 in the direction of increasing the volume of the second oil chamber 132 (direction of reducing the volume of the first oil chamber 130). That is, the force acts that pushes the second partition plate 126 rightward in FIG. 3.

The first partition plate 122 is fixed. Therefore, a force moving the piston 120 in the direction of separating the second partition plate 126 from the first partition plate 122 becomes a force acting in the direction of separating the piston 120 from the first friction member 58.

Further, where the working oil supplied from the working oil supply means 128 is supplied to the third oil chamber 134 and the pressure inside the third oil chamber 134 rises, a force acts to increase the volume of the third oil chamber 134. In this case, the front cover 49 does not move, whereas the piston 120 is supported movably. For this reason the pressure inside the third oil chamber 134 acts to move the piston 120 in the direction of separating from the first friction member 58.

The piston 120 is pushed by the elastic body 124 in the direction of pushing the first friction member 58. The principle according to which the elastic body 124 pushes the piston 120 is similar to that of the above-described oil pressure in the first oil chamber 130.

In the clutch mechanism 110, a force acting on the piston 120 in the direction of pushing the first friction member 58 can be also created by the elastic body 124 and the working fluid supplied from the circulating oil supply means 38, and a force acting upon the piston 120 in the direction of separating from the first friction member 58 can be created by the working oil supplied from the working oil supply means 128. As a result, an effect similar to that of Example 1 can be obtained. In Example 2, the number of oil chambers differs from that in Example 1 and therefore an equation for calculating the piston torque changes. For this reason, a balance of oil pressures for disengaging the clutch mechanism 110 and a balance of oil pressures engaging the clutch mechanism are different.

As shown in the clutch mechanism 26 and the clutch mechanism 110, a variety of arrangement positions can be selected for the elastic body and the contact of the piston with the engagement portion.

Example 3

Figure 4:
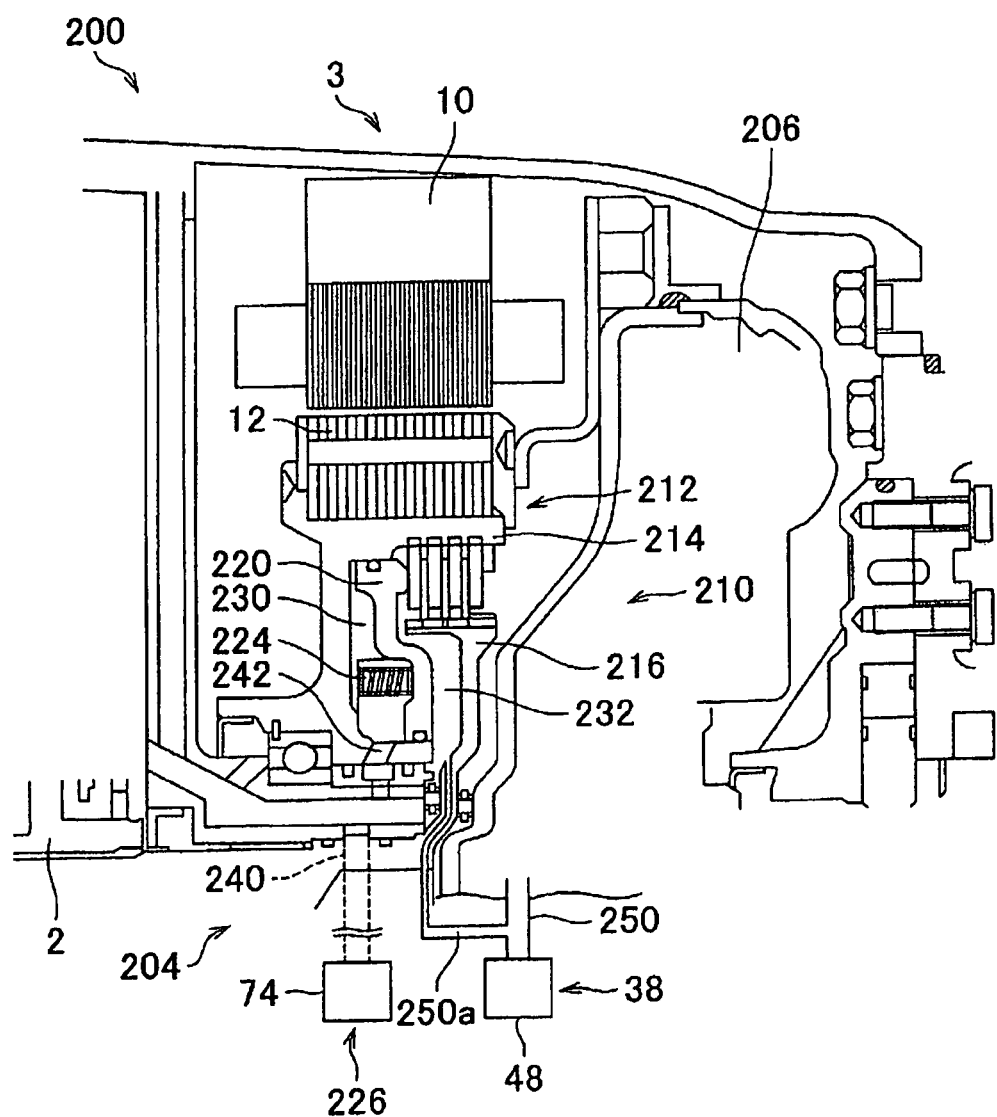
FIG. 4 is a schematic diagram illustrating yet another example of general structure of the drive apparatus including a power transmission device.

Example 3 will be explained below with reference to FIG. 4. The configuration of a drive apparatus 200 shown in FIG. 4 is similar to that of the drive apparatus shown in FIG. 1, except for the configuration of the power transmission device 204. Accordingly, the components similar to those of Example 1 will be assigned with same reference numerals and explanation thereof will be omitted. Thus, the explanation will be focused on specific features of Example 3.

The power transmission device 204 transmits mechanical power outputted by an engine 2 and a motor 3 to other components and includes an input shaft 20, an output shaft (not shown in the figure), a torque converter 206, a clutch mechanism 210, and an ECU controlling the operation of various units of the power transmission device 204. In the present example, the ECU is not shown in the figure. The configuration of the torque converter 206 is similar to that of the torque converter 24, except that components of the clutch mechanism 210 are not disposed inside. The explanation of components of the torque converter 206 are omitted.

The clutch mechanism 210 has an engagement portion 212, a piston 220, an elastic body 224, and a working oil supply means 226. The configuration of the engagement portion 212 is similar to that of the engagement portion 50 of the above-described Example 1, except for the position of a first holding portion 214 and a second holding portion 216. The first holding portion 214 is connected to a rotor 12 and held rotatably on the input shaft 20. The second holding portion 216 is connected to the input shaft 20. The rotor 12 is connected to the torque converter 206.

The piston 220 is constituted by a rigid body and disposed between the first holding portion 214 and the engagement portion 212 in the direction parallel to the rotation shaft. The end portion of the piston 220 on the inner diameter side and the end portion on the outer diameter side in the rotation direction of the input/output shaft are both supported by the first holding portion 214. The piston 220 is supported so that the piston can move in the direction parallel to the rotation shaft with respect to the first holding portion 214. The end portion of the piston 220 on the outer diameter side faces the first friction member 58. A region bounded by the first holding portion 214 and the piston 220 serves as a first oil chamber 230. A region bounded by the piston 220 and the second holding portion 216 serves as a second oil chamber 232.

The elastic body 224 is disposed in the first oil chamber 230 and pushes both the first holding portion 214 and the piston 220 in the direction parallel to the rotating shaft, that is, in the direction of separating the first holding portion 214 and the piston 220 from each other. Since the first holding portion 214 is fixed, the elastic body 224 generates a force moving the piston 220. In the present example, a coil spring is used as the elastic body 224, but such a selection is not limiting and a variety of elastic bodies, for example, a plate spring, can be used.

The working oil supply means 226 is a means for supplying the working oil into the first oil chamber 230. The working oil is supplied to the first oil chamber 230 from the working oil supply pump 74 via an oil path 240 and a supply port 242. The oil path 240 is formed in parts of the first holding portion 214 and input shaft 20, and the supply port 242 is formed in the first holding portion 214. As for the connection portion of various rotating portions of the oil path 240, the working oil can be moved, for example, by forming a passage for the working oil in the entire surface of one rotating portion and forming an orifice-like passage in the other rotating portion.

Part of the working fluid (circulating oil) supplied by the circulating oil supply means 38 into the torque converter 206 is supplied to the second oil chamber 232. More specifically, a branch pipe 250a is provided in part of the oil path 250 connecting the inside of the torque converter 206 with a circulating oil supply pump 48. The branch pipe 250a connects the oil path 250 with the second oil chamber 232 and supplies the working oil under a pressure proportional to a pressure inside the torque converter 206 to the second oil chamber 232.

The clutch mechanism 210 has the above-described configuration in which the first oil chamber 230 is filled with the working oil supplied from the working oil supply means 226 and the second oil chamber 232 is filled with the working fluid (working fluid circulating in the torque converter 206) supplied from the circulating oil supply means 38. In the clutch mechanism 210, when the first holding portion 214 and the second holding portion 216 do not move in the direction parallel to the rotating shaft, a state in which only the piston 220 can move is assumed.

As a result, the piston 220 is pushed by the working oil supplied from the working oil supply means 226 to the first oil chamber 230 in the direction of pushing the first friction member 58 and pushed by the working fluid supplied from the circulating oil supply means 38 to the second oil chamber 232 in the direction of separating from the first friction member 58. Further, the piston 220 is pushed by the elastic body 224 in the direction of pushing the first friction member 58. Since the first friction member 58 is pushed by the piston 220, the first friction member 58 and the second friction member 60 come into contact with each other and the engagement portion 212 assumes the engaged state.

Thus, in the clutch mechanism 210, a force acting on the piston 220 in the direction of pushing the first friction member 58 can be created by the elastic body 224 and the working oil supplied from the working oil supply means 226 into the first oil chamber 230 and a force acting on the piston 220 in the direction of separating from the rust friction member 58 can be created by the working fluid supplied from the circulating oil supply means 38.

As a result, with the clutch mechanism 210, when neither the working oil nor the working fluid is supplied, a force in the direction of pushing the first friction member 58 can be also generated in the piston 220 by the elastic body 224 and the clutch mechanism 210 can be engaged. Further, by adjusting the supply of the working oil and working fluid, it is possible to switch the clutch mechanism 210 between the engaged state and the disengaged state. Thus, the drive apparatus 200 can demonstrate an effect similar to that of Example 1. In the drive apparatus 200, the number of oil chambers and positions for working oil supply also differs from those in the above-described examples, and therefore an equation for calculating the piston torque changes. For this reason, a balance of oil pressures for disengaging the clutch mechanism 210 is different from a balance of oil pressures for engaging the clutch mechanism. More specifically, in order to engage the clutch, a force by which the circulating oil acts upon the piston may be larger than the sum total of a force by which the working oil acts upon the piston and a force by which the elastic body acts upon the piston. At this time, the clutch mechanism 210 can be disengaged if the working oil supply means 226 is stopped, a force by which the working oil acts upon the piston is made 0 (zero), and a force by which the circulating oil acts upon the piston is made larger than a force by which the elastic body acts upon the piston.

The same effect can be also obtained by generating a force in the direction of separating the piston 220 from the first friction member 58 by the circulating oil pressure. An oil path arrangement method is not particularly limited and a variety of paths can be obtained depending on the design. A mechanism for arranging the oil path is necessary, but the circulating oil can be used even when the clutch mechanism 210 is provided on the outside of the front cover of the torque controller.

It is preferred that the clutch mechanism adjust the supply amount of the oil pressure supply means for supplying the working oil or working fluid and adjust a pressure (oil pressure) applied to the piston according to the required torque. In other words, where the required torque is high, the supply amount of the oil pressure supply means that generates a force in the direction of pushing the piston against the first friction member is increased or the supply amount of the oil pressure supply means generating a force in the direction of separating the piston from the first friction member is decreased. Where the required torque is low, the supply amount of the oil pressure supply means that generates a force in the direction of pushing the piston against the first friction member is decreased or the supply amount of the oil pressure supply means generating a force in the direction of separating the piston from the first friction member is increased. As a result, an unnecessarily high torque is prevented from being applied to the clutch mechanism and the amount of supplied working oil and working fluid can be decreased. As a consequence, energy that drives the clutch mechanism can be efficiently used and energy consumption can be reduced.

In the disengagement operation of the clutch mechanism, it is preferred that working oil is not supplied or the supplied amount of the working oil is reduced by the oil pressure supply means that generates a force in the direction of pushing the piston against the first friction member. In other words, it is preferred that the oil pressure that pushes the piston in the direction of pressing against the first friction member be reduced or made 0 and it is even more preferred that this pressure be made equal to or lower than a preset reference value. More specifically, in Example 1 and Example 2, it is preferred that the circulating pressure be reduced. As a result, the oil pressure of the working oil supplied to engage the clutch mechanism can be reduced and the clutch mechanism can be disengaged by a smaller force.

In the above-described examples, the number of fluid-supplying mechanism can be reduced and energy necessary for driving the apparatus can be reduced. Therefore, in all of the examples, the working fluid supplied to the torque converter is brought into contact with the piston and a force is generated that moves the piston in one direction, but such a configuration is not limiting. For example, it is possible to use two working oil supply means and move the piston in both directions by the working oil supplied from the respective working oil supply means. Since the working oil is supplied independently, it is not necessary to connect the torque converter with the clutch mechanism by an oil path and the clutch mechanism can be disposed separately from the torque converter.

As described above, the power transmission device in accordance with the invention is useful as a device for transmitting power of a drive source and particularly suitable for transmitting power of a starter of an automobile to the engine.

The invention claimed is:

1. A power transmission device comprising:
a first rotating body rotated by a first drive mechanism;
a second rotating body rotated by a second drive mechanism;
a lockup clutch mechanism transmitting mechanical drive power from the second rotating body to an output shaft; and
a clutch mechanism switching between an engaged state and a disengaged state of the first rotating body and the second rotating body, wherein
the lockup clutch mechanism comprises:
a friction engagement portion,
a support portion for supporting the friction engagement portion, and
a biasing member that biases the support portion toward a turbine runner side; and
the clutch mechanism comprises:
an engagement portion that includes a first friction member connected to the first rotating body, and a second friction member connected to the second rotating body and disposed to face the first friction member, and that engages the first rotating body with the second rotating body by contact of the first friction member and the second friction member,
a rigid body that includes a contact portion coming into contact with the first friction member or the second friction member, and that moves the contact portion from a position of contact with the first friction member or the second friction member to a position of no contact with the first friction member and the second friction member,
an elastic body that applies to the rigid body a force moving the contact portion to a position of contact with the first friction member or the second friction member,
a first pushing mechanism that applies to the rigid body liquid pressure to move the contact portion to a position of contact with the first friction member or the second friction member,
a second pushing mechanism that applies to the rigid body liquid pressure to move the contact portion to a position of no contact with the first friction member and the second friction member, and
a torque converter connected to the second rotating body, wherein
the first pushing mechanism uses circulating fluid of the torque converter for the liquid pressure or the second pushing mechanism uses circulating fluid of the torque converter for the liquid pressure, wherein the friction engagement portion of the lockup clutch mechanism and the first friction member and the second friction member of the clutch mechanism are arranged at the same position in an axial direction.

2. The power transmission device according to claim 1, wherein
the rigid body is disposed in a position in which the rigid body is in contact with the first friction member and brings the first friction member and the second friction member into contact with each other.

3. The power transmission device according to claim 1, wherein
the first friction member is constituted by a plurality of plate-shaped first friction bodies,
the second friction member is constituted by a plurality of plate-shaped second friction bodies, and
the first friction bodies and the second friction bodies are disposed alternately.

4. The power transmission device according to claim 1, wherein
the first pushing mechanism and the second pushing mechanism adjust a pressure applied to the rigid body by adjusting at least one of an amount and pressure supplied to the rigid body side.

5. The power transmission device according to claim 1, wherein
the engagement portion, the rigid body, and the elastic body are disposed inside the torque converter.

6. The power transmission device according to claim 1, wherein
when the engagement portion is in the disengaged state, the first pushing mechanism makes the liquid pressure moving the contact portion to a position of contact with the first friction member or the second friction member equal to or lower than a set pressure value.

7. The power transmission device according to claim 1, wherein
when the engagement portion is in the engaged state, the second pushing mechanism makes the liquid pressure moving the contact portion to a position of no contact with the first friction member and the second friction member equal to or lower than a set pressure value.

8. The power transmission device according to claim 1, wherein
the engagement portion engages the first rotating body with the second rotating body when a force which acts upon the rigid body is an only force by which the elastic body pushes the rigid body.

9. The power transmission device according to claim 1, wherein
the first drive mechanism is a combustion engine, and
the second drive mechanism is an electric motor.

10. The power transmission device according to claim 9, wherein
the combustion engine is an internal combustion engine,
the power transmission device is provided at a vehicle, and
the force applied by the elastic body to the rigid body is a force engaging the first rotating body with the second rotating body so that necessary torque during a starter mode of the vehicle is transmitted to the first rotating body and the second rotating body.

* * * * *